UNITED STATES PATENT OFFICE.

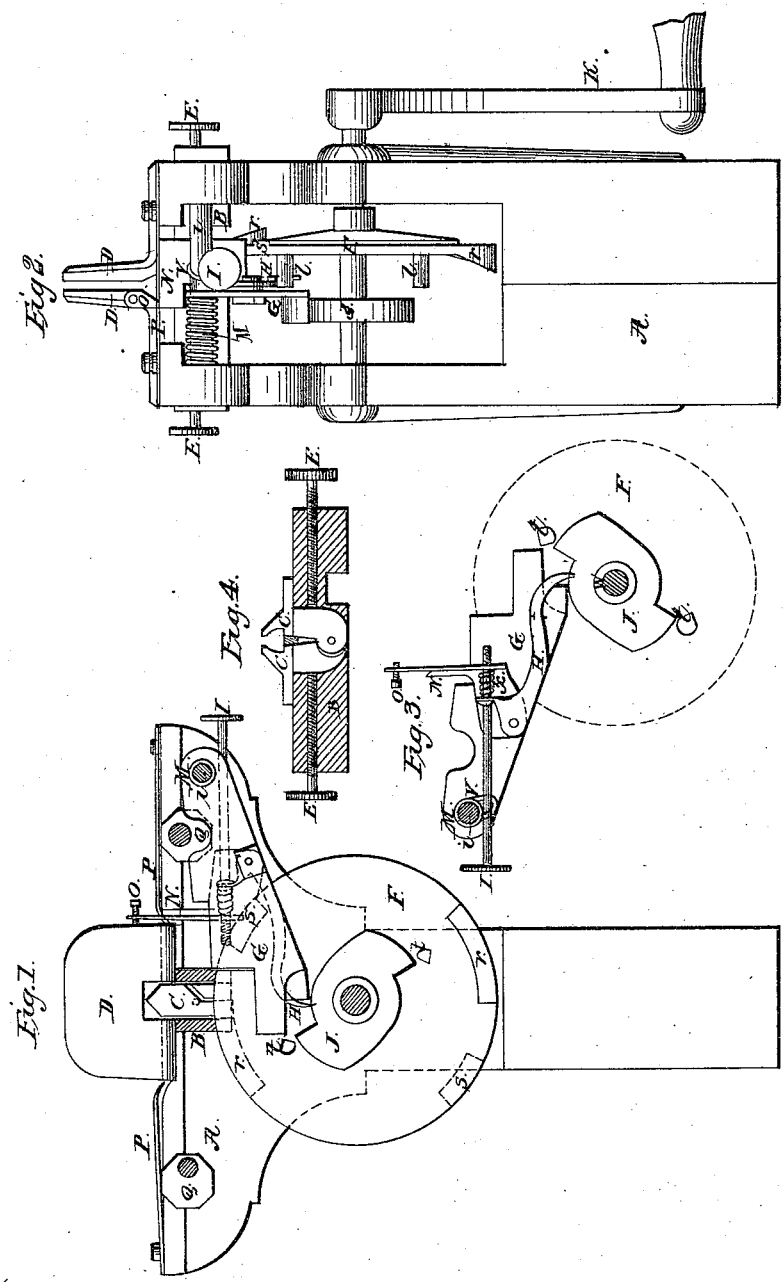

ABIJAH JOHNSON, OF WEST NEWTON, INDIANA.

IMPROVEMENT IN SAW-SETS.

Specification forming part of Letters Patent No. 82,845, dated October 6, 1868.

*To all whom it may concern:*

Be it known that I, ABIJAH JOHNSON, of West Newton, in the county of Marion and State of Indiana, have invented a new and Improved Saw-Set; and I do hereby declare that the following is a full, clear, and exact description thereof, which will enable skilled artisans to make and use the same, reference being had to the accompanying drawing, and to the letters of reference marked thereon, making part of this specification.

My invention has for its object the production of an efficient saw-set of simple construction, that will, by the act of turning a crank, automatically feed the saw and set the teeth; and it consists of a suitable stock, furnished with guide-jaws and guide-plates, that are made adjustable to the thickness of the blade and size of the teeth; a setting-bar furnished with adjustable nibs, to which reciprocating motion is given by means of cams on the sides of a disk, that is rotated by the crank, and a feed mechanism that moves the saw one tooth at a time.

Figure 1 is a vertical longitudinal section of the machine. Fig. 2 is an end view of the same. Fig. 3 is a detached detailed view of the feed mechanism. Fig. 4 is a vertical longitudinal section of the reciprocating setting-bar with its adjustable nibs, by which the teeth are set.

Similar letters of reference indicate like parts in the several figures.

A are castings, forming the stock, and to which all the other parts are attached. D are the guide-jaws, between which the saw is placed, and which hold it from lateral motion while the setting-nibs bend the teeth. These jaws are made adjustable to various thicknesses of saw-blades.

P are flexible guide-plates, on which the points of the teeth rest, arranged so that the saw will move freely over them, and by which it may be raised or lowered to adjust it, according as the teeth are coarse or fine, so that the setting-nibs will engage properly with them. These guide-plates are adjusted by means of many-sided eccentrics Q, fixed on shafts running across the machine.

C are the setting-nibs, pivoted by their lower ends in the transverse reciprocating bar B. The nibs are made adjustable by means of set-screws E, so as to regulate the set of the teeth. The closer the nibs are together the wider will be the set, and vice versa.

Reciprocating motion is given to the bar B and nibs C by means of cams $r$ on opposite sides of the rotating disk F, the edge of which works in a notch cut in the under side of bar B. Cams $s$ are also fixed on disk F, on opposite sides of it, having a less throw than cams $r$, and serve to return the bar B after setting each tooth, so that the opening between the nibs C is brought into line with the saw-blade, in order that the latter may be moved forward by the feed mechanism.

It will be understood that the cams $r\ s$ must be arranged in such relation to each other as to effect the above-described movement of bar B and setting-nibs C at the proper time not to interfere with the movement of the saw by the feed mechanism.

The feed mechanism consists of the lever G, hung by one end to the rod $i$, which the spiral spring M surrounds, double cam J on the same, shaft W, with the disk F and crank K, pins $t$ in the side of the disk, a bent lever, H, attached to the side of lever G, catch N, also attached by the same pin as lever H to lever G, set-screw I, spiral spring X, and set-screw O.

The inner end of lever G rests on the face of the double cam J, by which it is actuated to raise and engage the catch N with the teeth of the saw.

The cam J is so shaped as to hold the lever G and catch N up in the teeth of the saw until the catch is given its motion to carry the saw forward.

The catch N is actuated to move the saw forward by the pins $t$ in the disk F, the pins being set so as to engage the curved end of bent lever H.

The upper end of lever H rises above the pin or fulcrum by which it is attached to lever G, and the set-screw I passes through a slot in the upper end of lever H and screws into the catch N.

A collar on the set-screw rests against the lever H, and a spiral spring, X, around the set-screw, between the lever and catch N, serves to hold the two apart, keeping the lever against the collar, and thus holds the lower curved end of the lever in whatever relation to the pins $t$ it may be adjusted by the set-screw I.

The pins $t$ raise the lower curved end of lever H, throwing its upper end back, and the upper end resting against the collar on the set-screw draws it back, and with it the catch N.

By turning the set-screw in, and thus bringing the catch N and the upper end of lever H closer together, the lower end of lever H is thrown downward, and hence its movement by the pins $t$ is greater and moves the catch a greater distance, and so, when the set-screw is turned out, the spiral spring X presses the upper end of lever H back, raising its lower end, which is then given less motion by the pins $t$, and hence the movement of the catch N is less.

It is by this means that the movement of the catch may be adjusted to teeth of different size, and it will also be seen that this adjustment of the feed mechanism, combined with the adjustable guide-plates P, on which the points of the teeth rest, adapts the machine to set teeth of different size.

A set-screw, O, in the upper end of catch N, serves to adjust it so as to engage properly with the teeth on commencing to set them.

An elastic strap or other spring, V, connecting the outer end of the set-screw I with rod $i$, or to some upper portion of the stock, will serve to throw the catch N back to its starting-point and hold it down upon the lever G.

The spiral spring M around rod $i$ serves to keep the inner end of lever G down upon the cam J.

Motion is given to the setting-bar B and feed mechanism by means of crank K.

Having thus fully described my invention, what I claim as new, and desire to secure by Letters Patent, is—

1. The reciprocating bar B, furnished with the adjustable setting-nibs C C, and, in combination therewith, the adjustable guides D and P, all arranged and operating substantially as set forth.

2. Actuating the bar B by means of the disk F, furnished with the cams $r$ and $s$, arranged and operating substantially as set forth.

3. The feed mechanism consisting of the lever G, bent lever H, catch N, set-screw I, spiral springs X and M, cam J, and pins $t$, all arranged and operating substantially as set forth.

ABIJAH JOHNSON.

Witnesses:
O. F. MAYHEW,
VERLIN G. TANSEY.